United States Patent
Li (10) Patent No.: US 10,951,892 B2
(45) Date of Patent: Mar. 16, 2021

(54) BLOCK LEVEL RATE CONTROL (71) Applicant: Advanced Micro Devices, Inc., Santa Clara, CA (US)

(72) Inventor: Adam H. Li, Solana Beach, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/263,630

(22) Filed: Jan. 31, 2019

(65) Prior Publication Data
US 2020/0252611 A1    Aug. 6, 2020

(51) Int. Cl.
*H04N 19/124* (2014.01)
*H04N 19/176* (2014.01)
*H04N 19/137* (2014.01)
*H04N 19/146* (2014.01)

(52) U.S. Cl.
CPC ......... *H04N 19/124* (2014.11); *H04N 19/137* (2014.11); *H04N 19/146* (2014.11); *H04N 19/176* (2014.11)

(58) Field of Classification Search
CPC .. H04N 19/124; H04N 19/137; H04N 19/146; H04N 19/176
See application file for complete search history.

(56) References Cited

U.S. PATENT DOCUMENTS

| | | | | |
|---|---|---|---|---|
| 4,816,914 A | * | 3/1989 | Ericsson | .................... G06T 9/40 375/240.03 |
| 5,283,646 A | * | 2/1994 | Bruder | ................. H04N 19/197 341/76 |
| 2005/0047504 A1 | | 3/2005 | Sung et al. | |
| 2014/0105514 A1 | * | 4/2014 | Wu | ....................... H04N 19/176 382/244 |
| 2014/0269919 A1 | | 9/2014 | Rodriguez | |
| 2014/0270719 A1 | * | 9/2014 | Nakano | .................. H04N 7/181 386/328 |
| 2014/0376624 A1 | | 12/2014 | Li et al. | |

(Continued)

OTHER PUBLICATIONS

International Search Report and Written Opinion in International Application No. PCT/IB2019/057945, dated Dec. 9, 2019, 8 pages.

(Continued)

*Primary Examiner* — Mohammed S Rahaman
(74) *Attorney, Agent, or Firm* — Kowert Hood Munyon Rankin and Goetzel PC; Rory D. Rankin (57) ABSTRACT

Systems, apparatuses, and methods for performing efficient bitrate control of video compression are disclosed. Logic in a bitrate controller of a video encoder receives a target block bitstream length for a block of pixels of a video frame. When the logic determines a count of previously compressed blocks does not exceed a count threshold, the logic selects a quantization parameter from a full range of available quantization parameters. After encoding the block, the logic determines a parameter based on a first ratio of the achieved block bitstream length to an exponential value of an actual quantization parameter used to generate the achieved block bitstream length. For another block, when the count exceeds the count threshold, the logic generates a quantization parameter based on a ratio of the target block bitstream length to an average of parameters of previously encoded blocks.

20 Claims, 6 Drawing Sheets

(56) References Cited

U.S. PATENT DOCUMENTS

| | | |
|---|---|---|
| 2015/0055706 A1 | 2/2015 | Xu et al. |
| 2015/0256850 A1 | 9/2015 | Kottke et al. |
| 2018/0109804 A1 | 4/2018 | Saeedi |
| 2019/0045210 A1 | 2/2019 | Guermazi et al. |

OTHER PUBLICATIONS

"Co-occurrence matrix", Wikipedia.org, Sep. 7, 2016, 2 pages, https://en.wikipedia.org/wiki/Co-occurrence_matrix. [Retrieved Jul. 31, 2018].

* cited by examiner

BLOCK LEVEL RATE CONTROL

BACKGROUND

Description of the Related Art

Video processing algorithms are complex and include many different functions. Computing systems use advanced processors to satisfy the high computation demands. The video processing complexity increases as display resolution increases. Additionally, high definition video encoding applications are growing rapidly in the consumer market space. Further, video processing becomes more complex as the data bandwidth decreases and the processing occurs in real-time. For example, virtual reality (VR) applications, such as VR gaming applications, are becoming more popular.

For VR applications, a wireless communication link sends a video stream from a computer (or other device) to a virtual reality (VR) headset (or head mounted display (HMD). Transmitting the VR video stream wirelessly eliminates the need for a cable connection between the computer and the user wearing the HMD, thus allowing for unrestricted movement by the user. The VR video content is typically viewed through a lens to facilitate a high field of view and create an immersive environment for the user. Video compression is already a complex process, but video compression becomes more challenging with VR video transmission over a low-bandwidth wireless link while minimizing any perceived reduction in video quality by the end user. One of the video compression stages is determining the number of bits of a video frame that are generated or processed per unit of time. This rate is referred to as the "bitrate." The higher the bitrate, the less information lost during compression of the rendered pixels of the video frame. However, buffer storage capacities and network bandwidth limits do not support the higher bitrate for each block in the frame. Dynamically adjusting encoding parameters to set the bitrate for an encoder in real-time is one of the challenges of designing a video encoder.

In view of the above, efficient methods and systems for performing efficient bitrate control of video compression are desired.

BRIEF DESCRIPTION OF THE DRAWINGS

The advantages of the methods and mechanisms described herein may be better understood by referring to the following description in conjunction with the accompanying drawings, in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient bitrate control of video compression are disclosed. In various embodiments, a video processing system includes a transmitter sending a video stream over a wireless link to a receiver. The transmitter includes a processor and a video encoder (or encoder). In some implementations, the processor is a GPU, and the processor generates multiple blocks of pixels of a video frame. The generated blocks of pixels correspond to rendered blocks of pixels of the video frame. The encoder includes a bitrate controller and multiple encoding stages such as at least a transformation stage, a quantization stage and an entropy coding stage. The bitrate controller generates a quantization parameter used by the quantization stage.

The bitrate controller includes logic that receives a target block bitstream length for a block of a video frame being compressed. When the logic determines a count of previously compressed blocks of pixels of the video frame does not exceed a count threshold, the logic selects a first quantization parameter by searching a full range of available quantization parameters as an output quantization parameter. The logic conveys the output quantization parameter to an external quantization stage of an encoder. In some embodiments, the logic performs a binary search of the available quantization parameters. Afterward, the logic determines a rate control parameter based on a first ratio of the achieved block bitstream length to an exponential value of a quantization parameter used to generate the achieved block bitstream length.

Following, the logic determines an average rate control parameter using the rate control parameter and previous rate control parameters of previously encoded blocks. When the logic receives a block to encode and a target block bitstream length for the block, and the logic determines the count exceeds the count threshold, the logic generates a second quantization parameter, rather than searches for a quantization parameter from the full range of available quantization parameters. The logic generates the second quantization parameter based at least in part on the target block bitstream length. The logic determines a ratio of the target block bitstream length to the average rate control parameter found from the previously encoded blocks. The logic determines a natural logarithm of the ratio.

Figure 1:
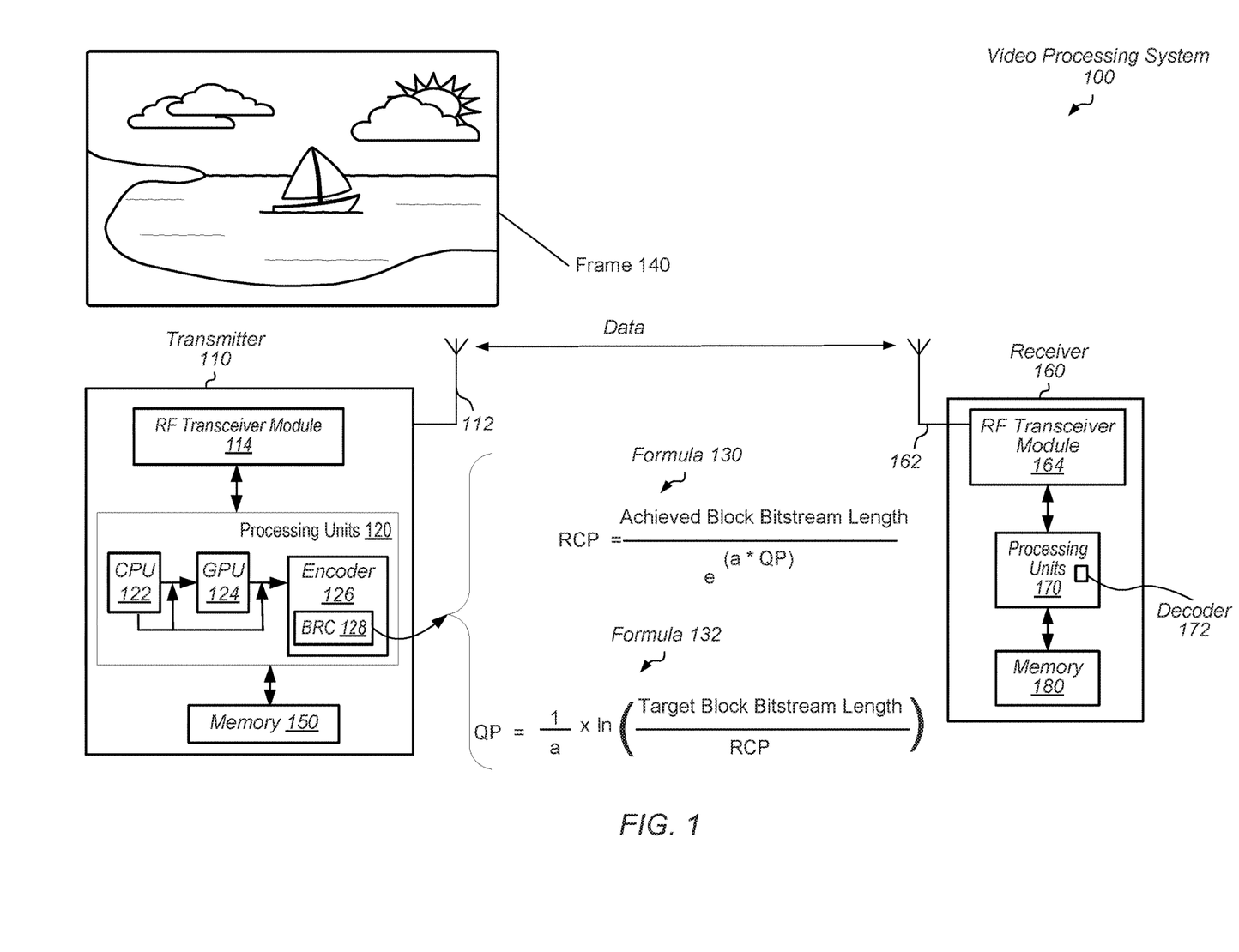
FIG. 1 is a block diagram of one embodiment of a video processing system.

Referring to FIG. 1, a block diagram of one embodiment of a video processing system 100 is shown. The video processing system 100 (or system 100) includes at least a first communications device (e.g., transmitter 110) and a second communications device (e.g., receiver 160) operable to communicate with each other with a limited bandwidth connection. It some embodiments, the limited bandwidth connection is a wired connection. In other embodiments, such as the illustrated embodiment, the limited bandwidth connection is a wireless connection. It is noted that transmitter 110 and receiver 160 can also be referred to as transceivers. Transmitter 110 and receiver 160 are representative of any type of communication devices and/or computing devices. For example, in various implementations, transmitter 110 and/or receiver 160 is one of a mobile phone, a tablet, a desktop computer, a laptop computer, a server, a head-mounted display (HMD), a television, another type of display, router, or other types of computing or communication devices.

In various designs, the transmitter 110 sends video information to the receiver 160 such as rendered information corresponding to the frame 140. Although the frame 140 depicts a picture of a sailboat on a lake, in other examples, the frame 140 includes information for a wide variety of visual information such as a scene of a sporting event, a scene of a video game, and so forth. The transmitter 110 includes any number and type of processors and memory devices for implementing processing units 120 and memory 150. For example, the processing units 120 use a variety of processors. Examples of the processors are a general-purpose central processing unit (CPU) 122, a graphics processing unit (GPU) 124, an accelerated processing unit (APU), an application specific integrated circuit (ASIC), a field programmable array (FGPA), a video encoder (126), and so forth. Memory 150 uses one or more of a variety of types of synchronous random access memory (SRAM), a variety of types of dynamic random access memory (DRAM), hard disk drives (HDDs), solid state drives (SSDs), and so forth.

In various implementations, the transmitter 110 uses a communication fabric (or fabric), for high-level interconnects and chip communication. The fabric is not shown for ease of illustration. In various embodiments, different types of traffic flows independently through the fabric. The fabric supports the independent flow by allowing a single physical fabric bus to include a number of overlaying virtual channels, or dedicated source and destination buffers, each carrying a different type of traffic. Each channel is independently flow controlled with no dependence between transactions in different channels.

The CPU 122 uses one or more processor cores with circuitry for executing instructions according to one of a variety of predefined general-purpose instruction sets. In some designs, the processor cores use simultaneous multithreading techniques combined with out-of-order scheduling and execution of instructions. The GPU 124 uses multiple parallel execution lanes in a single instruction multiple data word (SIMD) micro-architecture. The multiple parallel execution lanes are also referred to as SIMD units or SIMD lanes. The SIMD lanes operate in lockstep. Each of the SIMD lanes independently processes a unit of data independently of other units of data, but uses the same sequence of operations or commands as used by other SIMD lanes. In one example, one or more of an operating system scheduler and a command processor in the GPU schedules commands on the SIMD lanes.

In some implementations, the GPU 124 includes a pixel-processing pipeline. In other implementations, the pixel-processing pipeline is located externally from the GPU 124. One or more of the SIMD lanes and the pixel-processing pipeline performs pixel value calculations, vertex transformations, and other graphics operations such as color management, ambient-adaptive pixel (AAP) modification, dynamic backlight control (DPB), panel gamma correction, and dither. In various implementations, the processing units 120 include the video encoder 126 to encode (i.e., compress) a video stream prior to transmitting the video stream to receiver 160. In various implementations, the video encoder 126 (or encoder 126) is implemented using any suitable combination of hardware, such as circuitry for combinatorial logic and sequential elements, and/or software such as firmware. The encoder 126 generates bits in a bitstream and stores them in a buffer.

As used herein, an "amount of compression" is also referred to as a "compression level" or a "compression ratio." The larger the compression level or the compression ratio, the greater the amount of compression. Similarly, the smaller the compression level or the compression ratio, the smaller the amount of compression. It is noted that "blocks" can also be referred to as "slices" herein. As used herein, a "block" is defined as a group of contiguous pixels. For example, in one implementation, a block is a group of 8×8 contiguous pixels that form a square in the image being displayed. In other implementations, other shapes and/or other sizes of blocks are used. The number of bits of a video frame that are generated or processed per unit of time. This rate is referred to as the "bitrate." The higher the bitrate, the less information lost during compression of the rendered pixels of the video frame.

The encoder 126 receives uncompressed, rendered video information and generates the bits in the form of a bitstream in a compressed format that conforms to a standard video compression specification. Examples of the compression specification or standard are a variety of proprietary custom-designed codecs, MPEG-2 Part 2, MPEG-4 Part 2, H.264 (MPEG-4 Part 10), H.265 (High Efficiency Video Coding for supporting the compression of 4K video), Theora, RealVideo RV40, VP9, and AV1. The compression provided by the encoder 126 is typically lossy, so the output compressed video information lacks some of the information present in the original, rendered and uncompressed video information. The video information is typically divided into frames, and the frames are sometimes divided into macroblocks, or blocks. An important part of the lossy compression codec is attempting to determine which regions of the block or the frame video information to compress with higher compression ratios and which regions to compress with lower compression ratios. In addition, the compression algorithms track the amount of data used to represent the video, which is determined by the bitrate, while also tracking the storage levels of buffers storing the compressed video information to avoid underflow and overflow conditions. Accordingly, the encoder 126 faces many challenges to support compression of the received, rendered video information.

In various embodiments, when the GPU 124 sends rendered, uncompressed video information of a current block to the encoder 126, the bitrate controller (BRC) 128 of the encoder 126 selects an output quantization parameter (QP) based on either a full search of available quantization parameters or formula 132 at the bottom of FIG. 1. The decision is based on comparing a count of blocks previously encoded to a count threshold. The count threshold may be zero or a predetermined number. Formula 132 uses a ratio of a target block bitstream length to a rate control parameter (RCP). This algorithm is designed to that the rate control parameter is a near-constant value over a wide range of target size, quantization parameter, and blocks to be encoded.

In one example, a frame is divided into approximately tens of thousands of blocks although any other number of blocks is possible and contemplated. The bitrate controller 128 sets a count threshold at 100 blocks, in one example. For the first selected block, the bitrate controller 128 performs a full search of the range of available quantization parameters. In some designs, the bitrate controller 128 performs a binary search of the range of available quantization parameters. The quantization parameter is used to generate a scaling matrix and determines how much information to remove from a given block (or sub-block) of pixels. Typically, there is a range of values for the quantization parameter. In one example, the bitrate controller 128 has a range of available quantization parameters from 0 to 50, although other ranges are possible and contemplated.

To begin a search, the bitrate controller 128 selects a quantization parameter, and the encoder 126 compresses the selected block based on the selected quantization parameter. Afterward, in some embodiments, one of the bitrate controller 128 and the encoder 126 compares the achieved block bitstream length to the target block bitstream length. In one example, the target block bitstream length is 1,000 bits and the threshold length is 150 bits. In some designs, the threshold length is a percentage of the target block bitstream length. In other designs, particular ranges of target block bitstream lengths share a same threshold length. If the achieved block bitstream length is 1,400 bits, then the achieved block bitstream length is not within the threshold length of the target block bitstream length. Therefore, the bitrate controller 128 selects another quantization parameter, and the steps are repeated until the achieved block bitstream length is within the threshold length of the target block bitstream. For example, if the achieved block bitstream length is 985 bits, then the condition is satisfied. In other embodiments, no threshold length is used. Rather, the search continues until there are no more candidate quantization parameters to select, and then the quantization parameter that provided a corresponding achieved block bitstream length closest to the target block bitstream length is selected for input into formula 130.

The search may be performed with a binary search, i.e., the range of candidate quantization parameters is halved during each iteration of the search. If the full range of available quantization parameters is 0 to 100, then the first selected candidate quantization parameter is 50. If the achieved block bitstream length is greater than the target block bitstream length, then more compression is needed. Therefore, the quantization parameter needs to increase and the next selected candidate quantization parameter is 75, which is halfway between the quantization parameters 50 and 100. If the achieved block bitstream length is less than the target block bitstream length, then less compression is needed. Therefore, the quantization parameter needs to decrease and the next selected candidate quantization parameter is 25, which is halfway between the quantization parameters 0 and 50. Other embodiments operate on other than a halfway mark between parameters.

When no threshold length is used during a binary search, the above process continues until there are no more candidate quantization parameters to select. Afterward, if the closest achieved block bitstream length is 985 bits, then the bitrate controller 128 inserts, into the formula 130, the achieved block bitstream length of 985 bits and the value of the quantization parameter (QP) used to determine the achieved block bitstream length of 985 bits. The result of formula 130 is the rate control parameter (RCP). At this point in time, there is one rate control parameter to use for determining an accumulative rate control parameter. In some embodiments, the coefficient "a" in the formula 130 is selected by trial and error. In some embodiments, each of the exponential function in formula 130 and the natural logarithm function in formula 132 is implemented in hardware by a lookup table.

Continuing with the above example, for the second block of the multiple blocks of the frame, the bitrate controller 128 receives a second target block bitstream length for the second block. In an example, the second target block bitstream length is 1,250 bits. In some embodiments, the bitrate controller 128 adjusts the second target block bitstream length based on the earlier achieved block bitstream lengths. For example, the earlier and first achieved block bitstream length of 985 bits is 15 bits less than the first target block bitstream length. The accumulated difference of bits is −15 bits at this point in time. Therefore, in some embodiments, the bitrate controller 128 adds these 15 "extra" bits to the second target block bitstream length of 1,250 bits to obtain a new second target block bitstream length of 1,265 bits. In other embodiments, the bitrate controller 128 waits until after a particular count of blocks have been encoded before adjusting the target block bitstream length based on earlier achieved block bitstream lengths. In yet other embodiments, the bitrate controller 128 waits until the accumulated difference of bits is greater than a positive threshold or less than a negative threshold before adjusting the target block bitstream length based on the accumulated difference of bits. In some embodiments, the adjustment of the target block bitstream length of a current block is a based on a portion of the current accumulated difference of bits. For example, if the accumulated difference of bits is −20 bits and the portion is ten percent, then the target block bitstream length of the current block is adjusted by adding two bits. A variety of other methods for distributing the accumulated difference of bits is possible and contemplated. In still other embodiments, the bitrate controller 128 does not adjust the target block bitstream length.

After any adjustments to the target block bitstream length of the second block, the bitrate controller 128 repeats the steps described above for the first block. For example, in an embodiment, the bitrate controller 128 performs a search for a quantization parameter to send to a quantization stage of the encoder 126. After the bitrate controller 128 completes the search, the bitrate controller 128 inserts, into the formula 130, the achieved block bitstream length, such as 1,310 bits as an example, and the value of the quantization parameter (QP) used to determine the achieved block bitstream length of 1,310 bits. The result of formula 130 is the second rate control parameter for the second block. Afterward, the bitrate controller 128 determines an average rate control parameter using the current rate control parameter and the previous rate control parameters. At this point in time, there are two rate control parameters to use for determining an accumulative rate control parameter. In some embodiments, the bitrate controller 128 performs an average of the two values. In other embodiments, the bitrate controller 128 performs a weighted average of the two values. For example, the bitrate controller 128 performs an exponential moving average of the two values.

For the third selected block of the million blocks of the frame, the bitrate controller 128 receives a third target block bitstream length for the third block, and repeats the above steps. The bitrate controller 128 continues this iterative process until the bitrate controller 128 reaches the count threshold of 100. When the 100$^{th}$ block is reached, rather than perform a search to determine an initial quantization parameter, the bitrate controller 128 inserts, into formula 132, the target block bitstream length for the 100$^{th}$ block. In an embodiment, the target block bitstream length for the 100$^{th}$ block is an adjusted amount as described earlier. In addition, the bitrate controller 128 inserts, into formula 132, the accumulated rate control parameter found from the first 99 blocks. Therefore, in some embodiments, the bitrate controller 128 no longer uses a search of the full range of available quantization parameters to determine the initial quantization parameter. Rather, once the count threshold is reached, the bitrate controller 128 uses formula 132 to determine the initial quantization parameter.

In some embodiments, the bitrate controller 128 does not perform any search after using formula 132. In such embodiments, the initial quantization parameter found from formula 132 is the final quantization parameter, which the bitrate controller 128 both sends to the quantization stage of the encoder 126 and uses in formula 130. In other embodiments, the bitrate controller 128 uses formula 132 to determine the initial quantization parameter, but the bitrate controller 128 also continues a search afterward with a limited range. In one embodiment, the search is a binary search of the limited range. In some embodiments, the limited range includes a step of +/−2 quantization parameters from the determined initial quantization parameter. For example, if the initial quantization parameter determined from formula 132 is 18 and the limited range is +/−2, then the limited range for the binary search includes quantization parameters from 16 to 20. When the final achieved block bitstream length is found from the search of the limited range, the bitrate controller 128 inserts, into the formula 130, the final achieved block bitstream length and the value of the quantization parameters (QP) used to determine the final achieved block bitstream length. The result of formula 130 is the 100$^{th}$ rate control parameter.

The bitrate controller 128 updates the accumulated rate control parameter with the value of the 100$^{th}$ rate control parameter. For the 101$^{st}$ block and so on, the bitrate controller 128 performs the steps above used for the 100$^{th}$ block. This process continues as described above until the last block is encoded for the frame such as frame 140. When the bitrate controller 128 selects the quantization parameter in the above manner by using formulas 130 and 132, the computation is less complex and faster than generating a quantization parameter using a complex bitrate control algorithm based on estimating video complexity.

To transfer the rendered and compressed pixels of a frame, in some implementations, transmitter 110 and receiver 160 communicate wirelessly over the unlicensed 60 Gigahertz (GHz) frequency band. Wireless communication devices that operate within extremely high frequency (EHF) bands, such as the 60 GHz frequency band, are able to transmit and receive signals using relatively small antennas. For example, in one implementation, transmitter 110 and receiver 160 communicate in accordance with the Institute of Electrical and Electronics Engineers (IEEE) 802.11ad standard (i.e., WiGig). In other implementations, transmitter 110 and receiver 160 communicate wirelessly over other frequency bands and/or by complying with other wireless communication protocols, whether according to a standard or otherwise. For example, other wireless communication protocols that can be used include, but are not limited to, Bluetooth®, protocols utilized with various wireless local area networks (WLANs), WLANs based on the Institute of Electrical and Electronics Engineers (IEEE) 802.11 standards (i.e., WiFi), mobile telecommunications standards (e.g., CDMA, LTE, GSM, WiMAX), etc.

In one implementation, the video processing system 100 executes a virtual reality (VR) application for wirelessly transmitting frames of a rendered virtual environment from transmitter 110 to receiver 160. In other implementations, the video processing system 100 includes other types of applications that take advantage of the methods and mechanisms described herein. In one implementation, transmitter 110 includes at least radio frequency (RF) transceiver module 114, processing units 120, memory 150, and antenna 112. RF transceiver module 114 transmits and receives RF signals. In one implementation, RF transceiver module 114 is an mm-wave transceiver module operable to wirelessly transmit and receive signals over one or more channels in the 60 GHz band. RF transceiver module 114 converts baseband signals into RF signals for wireless transmission, and RF transceiver module 114 converts RF signals into baseband signals for the extraction of data by transmitter 110.

It is noted that RF transceiver module 114 is shown as a single unit for illustrative purposes. It should be understood that, in other implementations, the transmitter 110 includes any number of different units (e.g., chips) depending on the implementation of the RF transceiver module 114. Transmitter 110 also includes antenna 112 for transmitting and receiving RF signals. Antenna 112 represents one or more antennas, such as a phased array, a single element antenna, a set of switched beam antennas, etc., that can be configured to change the directionality of the transmission and reception of radio signals. As an example, antenna 112 includes one or more antenna arrays, where the amplitude or phase for each antenna within an antenna array can be configured independently of other antennas within the array. Although antenna 112 is shown as being external to transmitter 110, in other implementations, antenna 112 is included internally within transmitter 110. Additionally, in other embodiments, transmitter 110 is included in any number of other components, which are not shown to avoid obscuring the figure. Similar to transmitter 110, the components implemented within receiver 160 include at least RF transceiver module 164, processor 170, decoder 172, memory 180, and antenna 162, which are analogous to the components described above for transmitter 110. It should be understood that receiver 160 can also include or be coupled to other components (e.g., a display).

Figure 2:
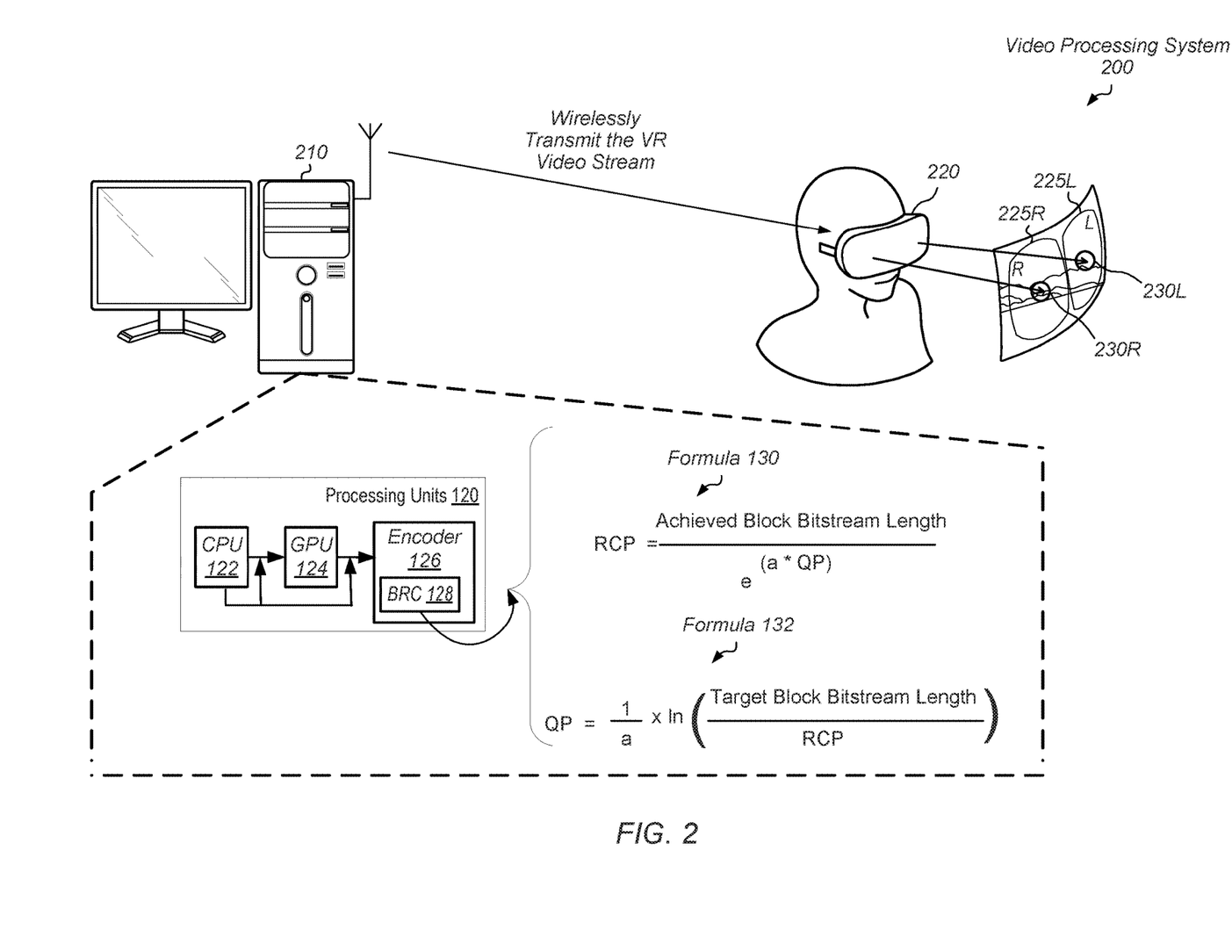
FIG. 2 is a block diagram of another embodiment of a video processing system.

Turning now to FIG. 2, a block diagram of one embodiment of a video processing system 200 is shown. Circuitry and logic previously described are numbered identically. In the illustrated embodiment, the video processing system 200 is a wireless virtual reality (VR) system 200. The video processing system 200 (or system 200) includes at least computer 210 and head-mounted display (HMD) 220. Computer 210 is representative of any type of computing device. Examples of the computer device are one or more processors, memory devices, input/output (I/O) devices, RF components, antennas, and other components indicative of a personal computer or other computing device. In other implementations, other computing devices, besides a personal computer, are utilized to send video data wirelessly to head-mounted display (HMD) 220. For example, computer 210 can be a gaming console, smart phone, set top box, television set, video streaming device, wearable device, a component of a theme park amusement ride, or otherwise. In addition, in other implementations, HMD 220 can be a computer, desktop, television or other device used as a receiver connected to a HMD or other type of display.

Computer 210 and HMD 220 each include circuitry and/or components to communicate wirelessly. It is noted that while computer 210 is shown as having an external antenna, this is shown merely to illustrate that the video data is being sent wirelessly. It should be understood that computer 210 can have an antenna which is internal to the external case of computer 210. Additionally, while computer 210 can be powered using a wired power connection, HMD 220 is typically battery powered. Alternatively, computer 210 can be a laptop computer (or another type of device) powered by a battery.

In one implementation, computer 210 includes circuitry, such as one or more of CPU 122 and GPU 124, which dynamically renders a representation of a VR environment to be presented to a user wearing HMD 220. For example, the CPU 122 executes a software application with instructions for rendering the VR environment and CPU 122 sends rendering commands to the GPU 124 and encoding (compressing) commands to the encoder 126. In other implementations, computer 210 includes other types of processors, including an application specific integrated circuit (ASIC), a field programmable gate array (FPGA), a digital signal processor (DSP), or other processor types. In various embodiments, the encoder 126 receives rendered blocks of a video frame and compresses the blocks. In various embodiments, during block-level video compression, the bitrate controller 128 of the encoder 126 uses the formulas 130 and 132.

Returning to the receiver device, HMD 220 includes circuitry to receive and decode a compressed bitstream sent by computer 210 to generate frames of the rendered VR environment. HMD 220 then drives the generated frames to the display integrated within HMD 220. Within each image that is displayed on HMD 220, the scene 225R being displayed on the right side 225R of HMD 220 includes a focus region 230R while the scene 225L being displayed on the left side of HMD 220 includes a focus region 230L. These focus regions 230R and 230L are indicated by the circles within the expanded right side 225R and left side 225L, respectively, of HMD 220.

In one implementation, the locations of focus regions 230R and 230L within the right and left half frames, respectively, are determined based on eye-tracking sensors within HMD 220. In another implementation, the locations of focus regions 230R and 230L are specified by the VR application based on where the user is expected to be looking. It is noted that the size of focus regions 230R and 230L can vary according to the implementation. For example, in one implementation, if HMD 220 includes eye tracking sensors to track the in-focus region based on where the user's eyes are pointed, then focus regions 230R and 230L can be relatively smaller. Otherwise, if HMD 220 does not include eye tracking sensors, and the focus regions 230R and 230L are determined based on where the user is expected to be looking, then focus regions 230R and 230L can be relatively larger. In other implementations, other factors can cause the sizes of focus regions 230R and 230L to be adjusted. For example, in one implementation, as the link quality between computer 210 and HMD 220 decreases, the size of focus regions 230R and 230L increases.

In one implementation, the encoder 126 uses the lowest amount of compression for blocks within focus regions 230R and 230L to maintain the highest subjective visual quality and highest level of detail for the pixels within these regions. It is noted that "blocks" can also be referred to as "slices" herein. As used herein, a "block" is defined as a group of contiguous pixels. For example, in one implementation, a block is a group of 8×8 contiguous pixels that form a square in the image being displayed. In other implementations, other shapes and/or other sizes of blocks are used. Outside of focus regions 230R and 230L, the encoder 126 uses a higher amount of compression, resulting in a lower subjective visual quality for the pixels being presented in these areas of the half-frames. This approach takes advantage of the human visual system with each eye having a large field of view but with the eye focusing on only a small area within the large field of view. Based on the way that the eyes and brain perceive visual data, a person will typically not notice the lower quality in the area outside of the focus region.

Figure 3:
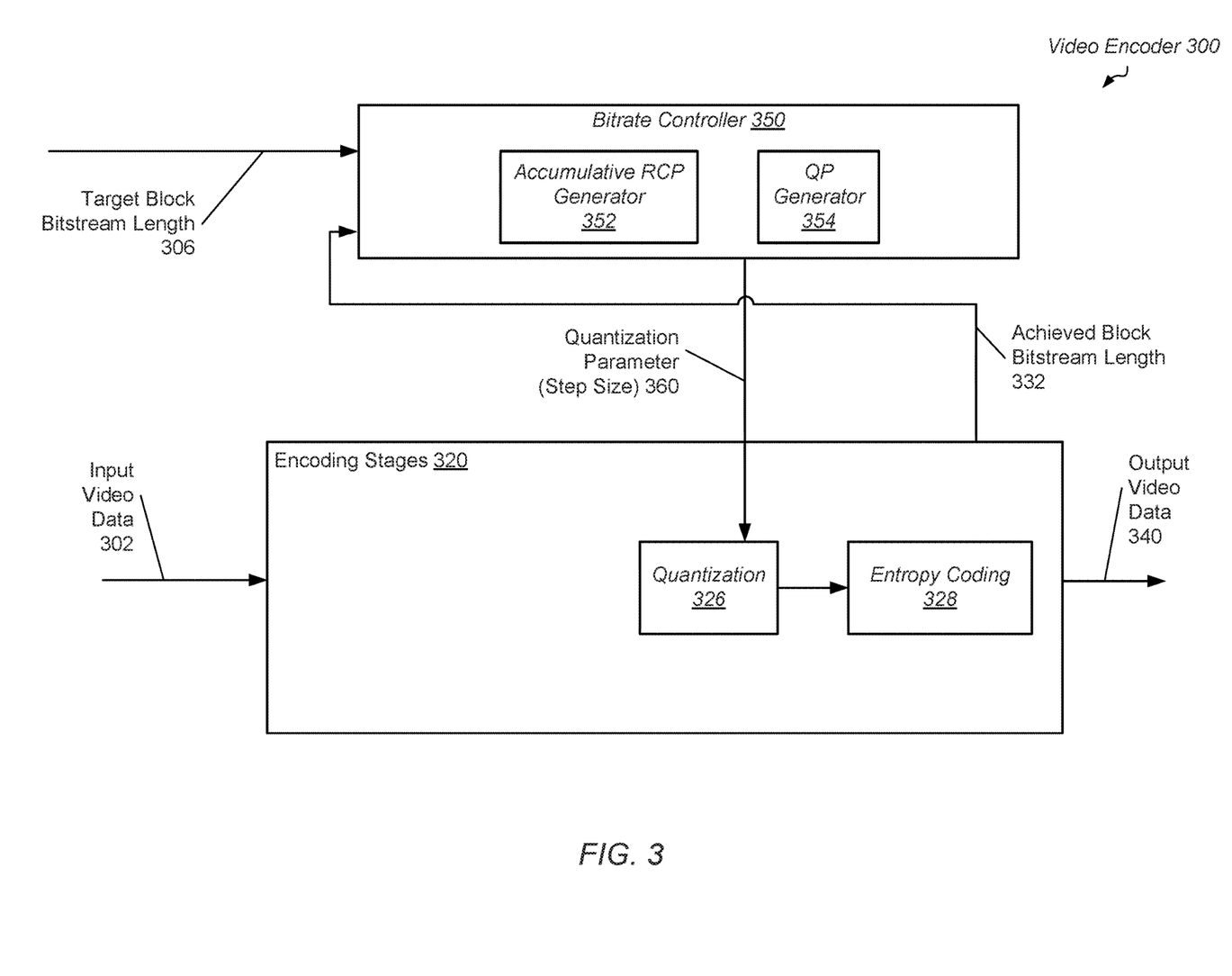
FIG. 3 is a block diagram of one embodiment of a video encoder.

Referring now to FIG. 3, a generalized block diagram of one embodiment of a video encoder 300 that uses side information to dynamically adjust compression is shown. In various embodiments, the video encoder 300 is equivalent to the encoder 126 (of FIG. 1 and FIG. 2). The video encoder 300 (or encoder 300) receives input video data 302 and generates output video data 340, which is a compressed version of the input video data 302. In various implementations, the encoder 300 compresses the input video data 302 based on one of a variety of video compression standards and the received side information 310. The encoder 300 includes the encoding stages 320 and the bitrate controller 350.

In various designs, the encoder 300 receives the input video data 302 as rendered data. For example, an external GPU generates multiple blocks of pixels for a frame based on rendering commands received from a CPU. In various designs, the encoder 300 generates the output video data 340 as a bitstream. As used herein, a "bitstream" is a sequence of bits. In some cases, the output bitstream of the encoder is measured as a "bitrate," which is a number of bits that are generated or processed per unit of time. For example, in some designs, the bitrate is expressed in units of kilobits per second (kbps) or megabits per second (mbps). Feedback loops located both within the encoding stages 320 set the bitrate for the output video data 340.

The encoding stages 320 includes multiple logic blocks or stages such as at least a quantization stage 326 and an entropy coding stage 328. The quantization stage 326 quantizes the coefficients received from previous stages on a block-by-block (or sub-block by sub-block) basis according to the quantization parameter 360 used as a step size. In one example, a coefficient matrix representing a particular block (or sub-block) is multiplied by a quantization scale code and divided element-wise by the quantization matrix followed by rounding such as rounding to a nearest integer. In some embodiments, the encoding stages 320 includes multiple types of available quantization blocks. Examples of the available quantizers are the H.263 Quantizer and the MPEG-4 Quantizer. In some examples, the selection of which quantization block and resulting quantization scale code to use is based on a user-defined selection made in a software application.

The entropy coding stage 328 reorders and performs entropy encoding of the output bitstream received from the quantization stage 326. The entropy coding stage 328 identifies particular sequences of bits in the received bitstream. Each of these particular sequences of bits is referred to as a symbol. The entropy coding stage 328 replaces symbols with other values such as code words or fractions. Two examples of the types of entropy coding algorithms are Huffman coding and arithmetic coding. Huffman-based coding algorithms replace symbols with code words based on a table lookup. Arithmetic-based coding algorithms replace symbols with a fraction between a range of 0 and 1. Hybrid approaches combine using the steps of a table lookup and an arithmetic operation, or select based on operating conditions whether to use a table lookup or an arithmetic operation.

The bitrate controller 350 determines the quantization parameter 360 and sends it to the quantization stage 326 of the encoding stages 320. The quantization parameter 360 is used to generate a scaling matrix and determines how much information to remove from a given block (or sub-block) of pixels. Typically, there is a range of values for the quantization parameter 360. In various embodiments, the accumulative rate control parameter (RCP) generator 352 uses the formula 130 and weighted moving average logic, and the quantization parameter (QP) generator 354 uses the formula 132 after a count threshold is reached. In some embodiments, the count threshold is zero and the QP generator 354 uses the formula 132 immediately.

When the bitrate controller 350 increases the quantization parameter 360, such as from 20 to 22, for regions, more compression is performed for these regions. When the bitrate controller 350 decreases the quantization parameter 360, such as from 20 to 16 for regions, less compression occurs for these regions. In some embodiments, the use of multiple prior frames for motion estimation introduces unacceptable memory requirement, complexity, and latency in the encoding process such as for virtual reality (VR) applications. For example, in some embodiments, the encoding stages 320 does not include a motion estimation stage. The logic blocks in the encoding stages 320 and other logic in the bitrate controller 350 are implemented with one or more of hardware, such as circuitry, software, such as firmware or user-defined software applications, and a combination of hardware and software.

Figure 4:
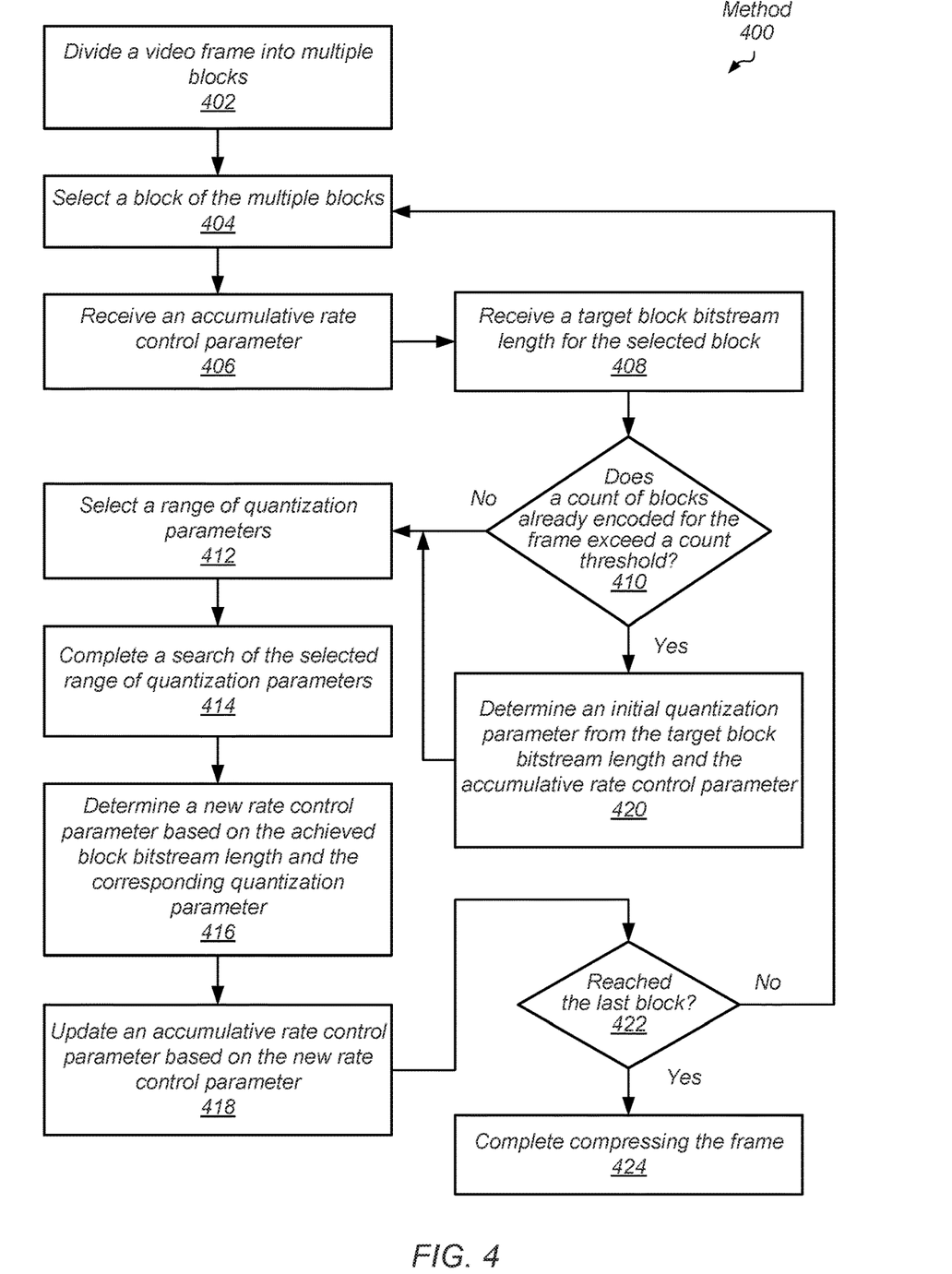
FIG. 4 is a flow diagram of one embodiment of a method for performing efficient bitrate control of video compression.

Referring now to FIG. 4, one embodiment of a method 400 for performing efficient block-level video compression is shown. For purposes of discussion, the steps in this embodiment (as well as in FIGS. 5-6) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement methods 400-600.

Logic divides a video frame into multiple blocks (block 402). Logic selects a block of the multiple blocks (block 404). For example, a video encoder receives rendered pixels of the block. Logic receives an accumulative rate control parameter (block 406). If the block is the first block, then the accumulative rate control parameter is not yet set to a value. Otherwise, the accumulative rate control parameter is based on a weighted moving average of rate control parameters found during the compression of previous blocks. Logic receives a target block bitstream length for a block of multiple blocks in a video frame (block 408). For example, a front-end interface of a video encoder receives this information. In some embodiments, the target block bitstream length is updated based on the accumulated difference of bits found for previously encoded blocks as described earlier for the bitrate controller 128 (of FIG. 1).

In some embodiments, the logic determines a count of previously compressed blocks of pixels of the video frame and compares this count to a count threshold. In some embodiments, the count threshold is stored in a programmable register. If a count of blocks already encoded for the frame does not exceed a count threshold ("no" branch of the conditional block 410), then logic selects a range of quantization parameters (block 412). For the case when the count does not exceed the count threshold, in an embodiment, the logic selects a full range of quantization parameters. In some embodiments, logic performs a binary search of the full range of quantization parameters as described earlier. Logic completes the search of the selected range of quantization parameters (block 414). If a length threshold is used, then the search completes when the achieved block bitstream length is within the threshold length of the target block bitstream length. If no length threshold is used, and logic performs a binary search, then the search completes when there are no more candidate quantization parameters to select. In an embodiment, logic performs the search steps described earlier for the bitrate controller 128 (of FIG. 1). A variety of other search techniques is also possible and contemplated. Afterward, logic determines a new rate control parameter based on the achieved block bitstream length and the value of the quantization parameter (QP) used to determine the achieved block bitstream length (block 416). In various embodiments, the logic uses formula 130 (of FIG. 1).

After determining the new rate control parameter, logic updates an accumulative rate control parameter based on the new rate control parameter (block 418). For example, logic in the bitrate controller determines an average rate control parameter using the current rate control parameter and the previous rate control parameters of previously encoded blocks. In some embodiments, the bitrate controller or other logic performs an average of the values. In other embodiments, the bitrate controller or other logic performs a weighted average of the values. For example, the bitrate controller or other logic performs an exponential moving average of the values.

If the last block is not reached ("no" branch of the conditional block 422), then control flow of method 400 returns to block 404 where logic selects another block of the multiple blocks to encode. For the next selected block, the logic updates a count of blocks and compares this count to a count threshold. If the count of blocks already encoded for the frame is greater than the count threshold ("yes" branch of the conditional block 410), then logic determines an initial quantization parameter from the target block bitstream length and the accumulative rate control parameter (block 420). In various embodiments, logic uses the formula 132 (of FIG. 1).

Afterward, control flow of method 400 moves to block 412 where logic selects a range of quantization parameters. For the case when the count is greater than the count threshold, in one embodiment, the logic selects no range of quantization parameters and the determined initial quantization parameter is also the final quantization parameter for the block. In such cases, the search is already completed (block 414), since there is no search. In another embodiment, when the count is greater than the count threshold, the logic selects a limited range of quantization parameters that is smaller than the full range of quantization parameters. In an embodiment, the limited range includes a step of +/−2 quantization parameters from the determined initial quantization parameter. For example, if the initial quantization parameter determined from formula 132 is 18 and the limited range is +/−2, then the limited range for the binary search includes quantization parameters from 16 to 20.

In block 414, logic completes the search as described earlier. Now, with the count being greater than the count threshold, the number of iterations of encoding with a different quantization parameter is less when compared to selecting quantization parameters based on a full range of available quantization parameters. In addition, the use of complex modeling is avoided such as a motion estimation stage in the video encoder sending the difference values, or residuals, to the bitrate controller, which uses these difference values in a rate-quantization model or other logic to estimate the video complexity of the block when generating the quantization parameter. Avoiding the use of these models simplifies the implementation and reduces latency. If the last block is reached ("yes" branch of the conditional block 422), then logic completes compressing the multiple blocks of the frame (block 424).

Figure 5:
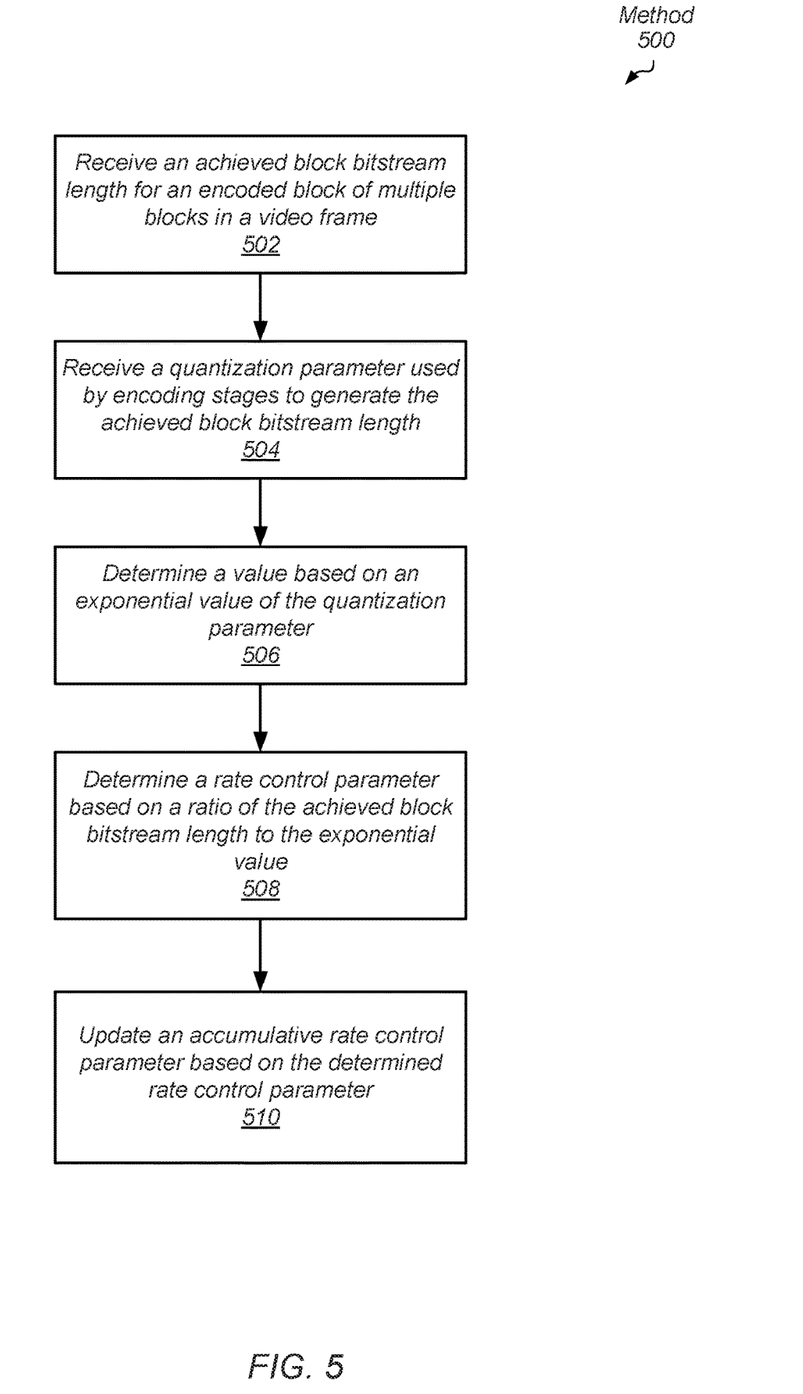
FIG. 5 is a flow diagram of one embodiment of a method for performing efficient bitrate control of video compression.

Referring now to FIG. 5, one embodiment of a method 500 for performing efficient block-level video compression is shown. Logic divides a video frame into multiple blocks and selects a block of the multiple blocks for encoding. For example, a video encoder receives rendered pixels of the block. During the encoding of the block, logic receives an achieved block bitstream length for the encoded block of multiple blocks in the video frame (block 502). Logic receives a quantization parameter used by encoding stages to generate the achieved block bitstream length (block 504). Logic determines a value based on an exponential value of the quantization parameter (block 506). In various embodiments, the value is the denominator in the formula 130 (of FIG. 1).

Logic determines a rate control parameter based on a ratio of the achieved block bitstream length to the exponential value (block 508). In various embodiments, the logic uses formula 130 (of FIG. 1). Logic updates an accumulative rate control parameter based on the determined rate control parameter (block 510). For example, logic in the bitrate controller determines an average rate control parameter using the current rate control parameter and the previous rate control parameters of previously encoded blocks. In some embodiments, the bitrate controller or other logic performs a weighted average of the values such as an exponential moving average of the values.

Figure 6:
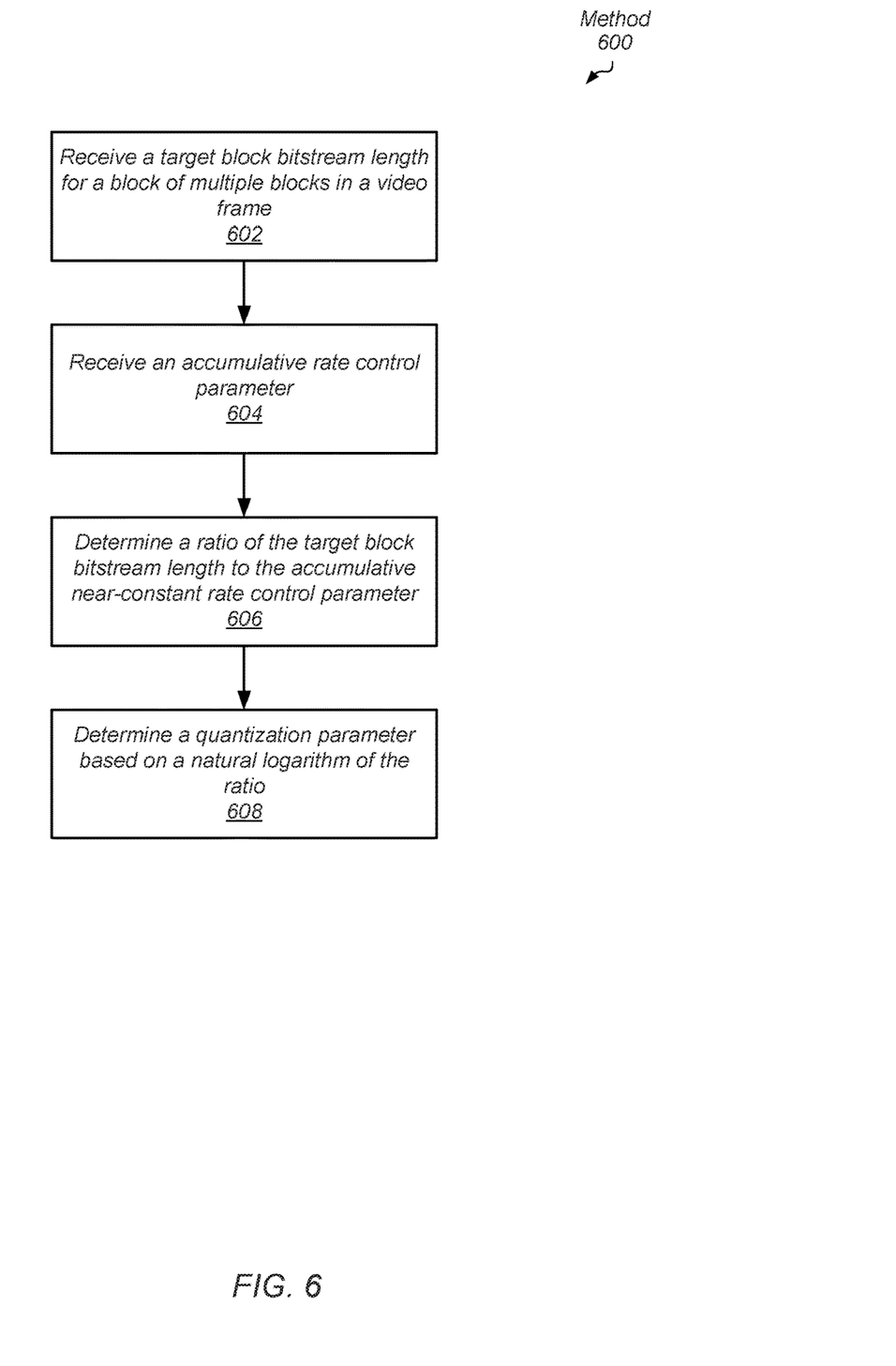
FIG. 6 is a flow diagram of one embodiment of a method for performing efficient bitrate control of video compression.

Referring now to FIG. 6, one embodiment of a method 600 for performing efficient block-level video compression is shown. Logic receives a target block bitstream length for a block of multiple blocks in a video frame (block 602). For example, a front-end logic of a video encoder receives this information. In some embodiments, logic updates the target block bitstream length based on the accumulated difference of bits found for previously encoded blocks as described earlier for the bitrate controller 128 (of FIG. 1).

Logic receives an accumulative rate control parameter (block 604). The accumulative rate control parameter is based on a weighted moving average of rate control parameters found during the compression of previous blocks. Logic determines a ratio of the target block bitstream length to the accumulative near-constant rate control parameter (block 606). Logic determines a quantization parameter based on a natural logarithm of the ratio (block 808). For example, logic uses the formula 132 (of FIG. 1).

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   logic comprising circuitry; and
   wherein the logic is configured to:
   receive a target block bitstream length for a single block of pixels of a video frame being compressed, the video frame comprising a plurality of blocks of pixels;
   in response to determining a count of previously compressed blocks of pixels of the video frame does not exceed a count threshold, perform an iterative process to select a quantization parameter as an output quantization parameter, wherein to perform the iterative process the logic is configured to:
   encode the single block two or more times using at least two different quantization parameters; and
   set, as an output quantization parameter, a given quantization parameter of the at least two different quantization parameters;
   in response to determining the count exceeds the count threshold, set the output quantization parameter without performing the iterative process;
   convey the output quantization parameter to an external quantization stage of an encoder.

2. The apparatus as recited in claim 1, wherein the logic is further configured to determine a rate control parameter based on a first ratio of an achieved block bitstream length to a natural exponential function of a quantization parameter used to generate the achieved block bitstream length.

3. The apparatus as recited in claim 1, wherein the given quantization parameter is a quantization parameter determined to result in a desired block bitstream length.

4. The apparatus as recited in claim 2, wherein the logic is further configured to determine an average rate control parameter using the rate control parameter and previous rate control parameters of previously encoded blocks.

5. The apparatus as recited in claim 1 wherein in further response to determining the count exceeds the count threshold, the logic is further configured to determine a ratio of the target block bitstream length to an average rate control parameter.

6. The apparatus as recited in claim 1 wherein in response to determining the count exceeds the count threshold, the logic is configured to set the output quantization parameter based in part on a natural logarithm of the target block bitstream length.

7. The apparatus as recited in claim 1, wherein the logic is further configured to update the target block bitstream length based on differences between target block bitstream lengths and achieved block bitstream lengths of previously compressed blocks of pixels of the video frame.

8. The apparatus as recited in claim 1, wherein the logic is further configured to determine the output quantization parameter independent of motion vectors.

9. A method, comprising:
   receiving a target block bitstream length for a single block of pixels of a video frame being compressed, the video frame comprising a plurality of blocks of pixels;

in response to determining a count of previously compressed blocks of pixels of the video frame does not exceed a count threshold, performing an iterative process comprising:
    encoding the single block two or more times using at least two different quantization parameters; and
    setting, as an output quantization parameter, a given quantization parameter of the at least two different quantization parameters;
in response to determining the count exceeds the count threshold:
    setting the output quantization parameter without performing the iterative process; and
conveying the output quantization parameter to an external quantization stage of an encoder.

10. The method as recited in claim 9, further comprising determining a rate control parameter based on a first ratio of an achieved block bitstream length to a natural exponential function of a quantization parameter used to generate the achieved block bitstream length.

11. The method as recited in claim 10, wherein the given quantization parameter is a quantization parameter determined to result in a desired block bitstream length.

12. The method as recited in claim 10, further comprising determining an average rate control parameter using the rate control parameter and previous rate control parameters of previously encoded blocks.

13. The method as recited in claim 9, wherein in further response to determining the count exceeds the count threshold, the method further comprises determining a ratio of the target block bitstream length to an average rate control parameter.

14. The method as recited in claim 9, wherein in response to determining the count exceeds the count threshold, the method further comprises setting the output quantization parameter based in part on a natural logarithm of the target block bitstream length.

15. The method as recited in claim 9, further comprising updating the target block bitstream length based on differences between target block bitstream lengths and achieved block bitstream lengths of previously compressed blocks of pixels of the video frame.

16. A non-transitory computer readable storage medium storing program instructions, wherein the program instructions are executable by a processor to:
    receive a target block bitstream length for a single block of pixels of a video frame being compressed, the video frame comprising a plurality of blocks of pixels;
    in response to determining a count of previously compressed blocks of pixels of the video frame does not exceed a count threshold, perform an iterative process to select a quantization parameter as an output quantization parameter, wherein to perform the iterative process the logic is configured to:
        encode the single block two or more times using at least two different quantization parameters; and
        set, as an output quantization parameter, a given quantization parameter of the at least two different quantization parameters;
    in response to determining the count exceeds the count threshold, set the
        output quantization parameter without performing the iterative process;
    convey the output quantization parameter to an external quantization stage of an encoder.

17. The non-transitory computer readable storage medium as recited in claim 16, wherein the program instructions are further executable by a processor to determine a rate control parameter based on a first ratio of an achieved block bitstream length to a natural exponential function of a quantization parameter used to generate the achieved block bitstream length.

18. The non-transitory computer readable storage medium as recited in claim 16, wherein the given quantization parameter is a quantization parameter determined to result in a desired block bitstream length.

19. The non-transitory computer readable storage medium as recited in claim 16, wherein the program instructions are further executable by a processor to determine an average rate control parameter using the rate control parameter and previous rate control parameters of previously encoded blocks.

20. The non-transitory computer readable storage medium as recited in claim 16, wherein in further response to determining the count exceeds the count threshold, the program instructions are further executable by a processor to determine a ratio of the target block bitstream length to an average rate control parameter.

* * * * *